United States Patent [19]
Brevick et al.

[11] Patent Number: 5,585,549
[45] Date of Patent: Dec. 17, 1996

[54] RAPID LIFE TEST SYSTEM FOR ENGINE CYLINDER BLOCK

[75] Inventors: John E. Brevick, Livonia, Mich.; Gary D. Liimatta, Stratford Upon Avon, England

[73] Assignee: Ford Motor Company, Dearborn, Mich.

[21] Appl. No.: 488,266

[22] Filed: Jun. 9, 1995

[51] Int. Cl.⁶ .................................................. G01M 15/00
[52] U.S. Cl. .............................. 73/49.7; 73/47; 73/117.1
[58] Field of Search ................................ 73/46, 47, 49.7, 73/592, 807, 816, 117.1, 118.1, 119 R

[56] References Cited

U.S. PATENT DOCUMENTS

| | | |
|---|---|---|
| 3,360,984 | 1/1968 | Salsbury et al. ........................ 73/49.7 |
| 3,650,147 | 3/1972 | Moyer ..................................... 73/49.7 |
| 3,690,162 | 9/1972 | Stecher . | |
| 3,751,978 | 8/1973 | Crawford ................................ 73/49.7 |
| 3,973,429 | 8/1976 | Durgan et al. .......................... 73/49.7 |
| 4,157,028 | 6/1979 | Moffett, III ............................. 73/49.7 |
| 4,213,328 | 7/1980 | Roeschlaub et al. .................... 73/49.7 |
| 4,594,882 | 6/1986 | Wheeler .................................. 73/49.7 |
| 4,617,824 | 10/1986 | Cybulski et al. ....................... 73/49.7 |
| 5,054,314 | 10/1991 | Cofflard et al. . | |
| 5,492,006 | 2/1996 | Beckett ................................... 73/119 R |

Primary Examiner—Richard Chilcot
Assistant Examiner—Eric S. McCall
Attorney, Agent, or Firm—Jerome R. Drouillard

[57] ABSTRACT

A system for hydrostatically testing a cylinder block for an internal combustion engine simulates the gas loads imposed upon the cylinder block when the engine is firing. The system includes an engine cylinder block having multiple cylinders, with pressure conduits extending from a series of hydraulic control valves to each of the operating cylinders such that hydraulic fluid is conducted into the engine cylinders at pressures and frequencies which approximate, if not exceed, the magnitude and frequency of the gas pressure loading imposed upon the operating cylinders when the engine is firing.

18 Claims, 4 Drawing Sheets

FATIGUE TEST CYLINDER PRESSURE COMPARISON

○ GAS PRESSURE CURVE   □ HYDRAULIC PRESSURE CURVE

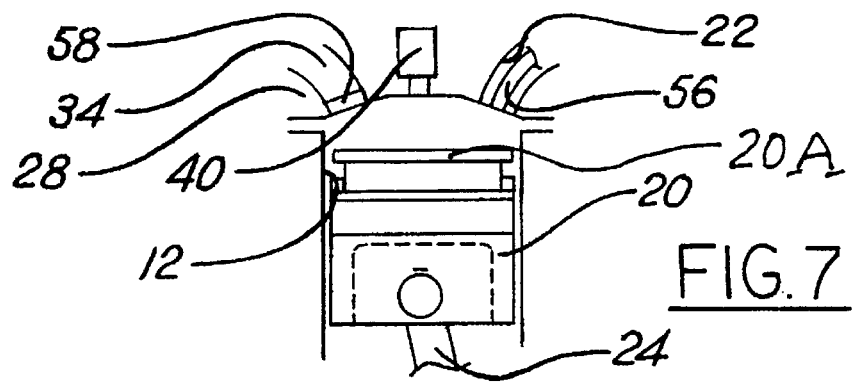
FIG. 7
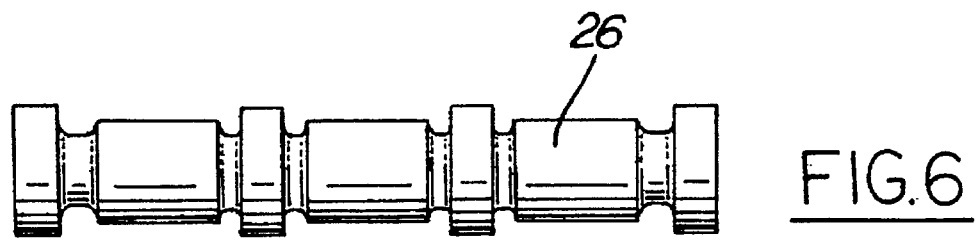
FIG. 6
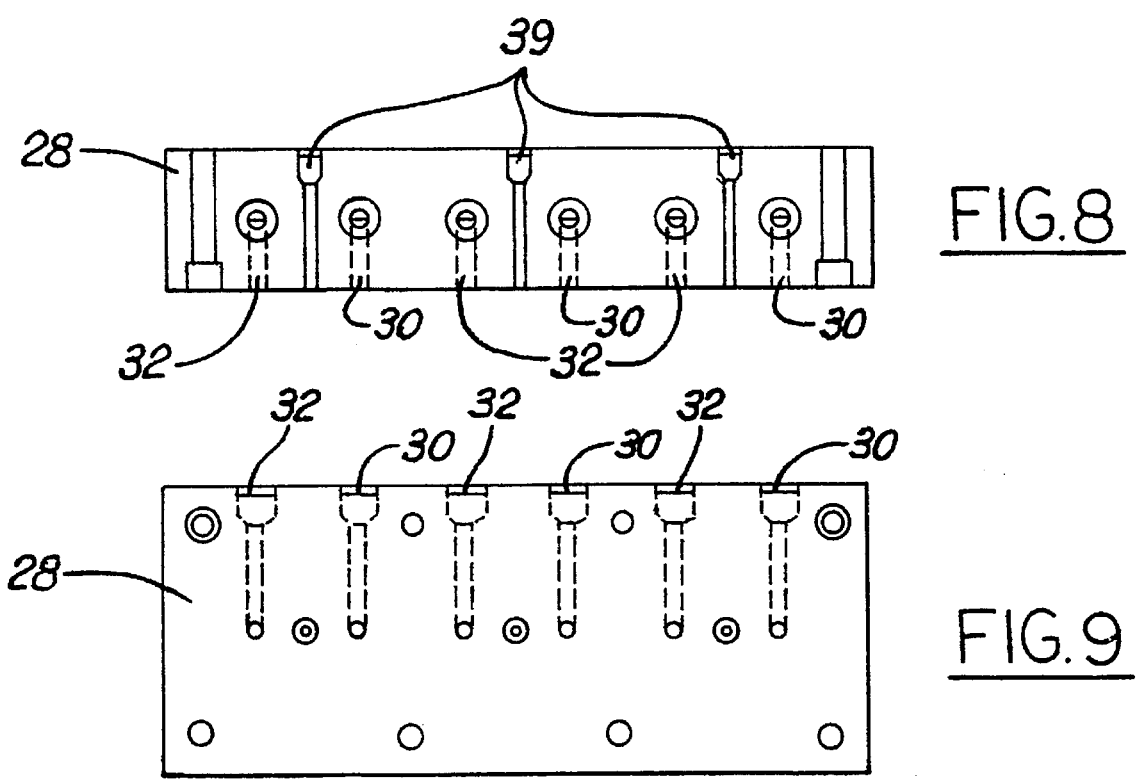
FIG. 8
FIG. 9

RAPID LIFE TEST SYSTEM FOR ENGINE CYLINDER BLOCK

BACKGROUND OF THE INVENTION

1. Field of the Invention

The present invention relates to a system for a rapid testing to determine the structural integrity of cylinder blocks of internal combustion engines. This testing uses hydraulic pressure, rather than mechanical loading, to simulate the force of combustion gases on the cylinder block, and if desired, the cylinder head.

2. Disclosure Information

Bench testing of internal combustion engine componentry has general taken the form of mechanical testing, as shown in U.S. Pat. No. 3,690,162 (Stecher), in which pistons and piston rings are subjected to intense vibratory forces by mechanical excitation systems. It has also been known to subject cylinder blocks to mechanical forces imposed by press-like mechanisms which load the engine block in a manner which is thought to simulate, albeit very inaccurately, forces imposed on the block when the engine is firing. U.S. Pat. No. 5,054,314 (Cofflard et al.) discloses a system for using an injection pump to test an engine cylinder head by subjecting the cylinder head to hydraulic pressure. Unfortunately, the system of the '314 patent contains nothing regarding the engine cylinder block, nor does it appear to allow rapid testing of multiple cylinders in an engine so as to more accurately simulate the effect of firing stresses upon the engine. Although it is known to test more than one cylinder of an engine with a hydraulic pressure test, it is not known to use a system in which multiple cylinders are operated with a fewer number of servo valves than the maximum number of cylinders being tested, with multiple cylinders being supplied with hydraulic oil by a single servo valve, according to the present invention.

A system according to the present invention allows rapid life cycle testing of engine cylinder blocks in a manner which closely simulates the stresses imposed by combustion gases upon the cylinder block, and if desired, the cylinder head. According to one aspect of the present invention, the cylinder block is stressed sequentially according to the engine's firing order, with the result that the stresses imposed on the block by the hydraulic fluid may more closely simulate the stresses arising in a firing engine.

Other advantages of the present invention will become apparent to the reader of this specification.

SUMMARY OF THE INVENTION

A system for hydrostatically testing a cylinder block of an internal combustion engine by simulating the gas loads imposed upon the cylinder block when the engine is firing includes an engine cylinder block having a plurality of operating cylinders, an electronic controller, a source of hydraulic pressure, a plurality of hydraulic control valves operatively connected with the source of hydraulic pressure, with the valves also being connected with and controlled by the electronic controller, and a plurality of pressure conduits extending from the hydraulic control valves to the operating cylinders such that hydraulic fluid is conducted into at least two of the engine cylinders from each of the hydraulic control valves at pressures and frequencies which approximate the magnitude and frequency of the gas pressure loading imposed upon the operating cylinders when the engine is firing. Hydraulic fluid may be furnished to the operating cylinders at variable pressure which is varied with time to simulate the pressure imposed upon the operating cylinders when the engine is firing. At least two engine cylinders are serviced by each of the pressure conduits, with the cylinders serviced by each of the conduits being separated such that the forces produced within the engine block by the hydraulic pressure within the operating cylinders do not cancel one another, with the result that different areas of the cylinder block are stressed simultaneously. As a result, the present system can be used to test an engine, including the cylinder block, and, if desired, the cylinder head, in much less time than was the case with conventional systems. The electronic controller may be used to direct the hydraulic control valve to supply oil under pressure to the operating cylinders such that the pressure imposed upon the engine's cylinders follows the firing order of the engine. If desired, a system according to the present invention may employ a single hydraulic control valve having a plurality of discharge ports with at least one discharge port for each of the operating cylinders of the engine. This hydraulic control valve may comprise an in-line valve or a rotary valve. In the case of a rotary valve, the valve would be driven by a rotary power source at a speed which simulates the firing frequency of the engine with the discharge ports being connected with the pressure conduits such that the operating cylinders are subjected to hydraulic pressure loading in the same sequence as the firing order of the engine.

In another embodiment, the hydraulic control valve may comprise a distributor valve having a plurality of discharge ports with at least one port for each of the cylinders of the engine.

A system according to the present invention may further comprise a plurality of pressure transducers for monitoring the hydraulic pressure produced within the operating cylinders as they are filled with hydraulic fluid, with each of the transducers operatively connected with a controller, and with each transducer producing a pressure signal which is related to the magnitude of the hydraulic pressure within a particular cylinder being measured, with the controller operating the hydraulic pressure source according to the value of each pressure signal such that the operating cylinders are subjected to substantially equal hydraulic pressures.

In order to accommodate pressures which exceed those found within a firing engine, a test rig according to the present invention may further comprise a plurality of pistons and connecting rods mounted within the operating cylinders in the location of the engine's standard pistons and connecting rods, with the connecting rods being connected to a center shaft taking the place of the engine's crankshaft. The center shaft has a bending stiffness which duplicates the bending stiffness of the engine's standard crankshaft.

BRIEF DESCRIPTION OF THE DRAWINGS

FIG. 6 illustrates a center shaft suitable for employment in an engine being tested according to the present invention.

FIG. 7 illustrates a piston and cylinder arrangement suitable for use with a system according to the present invention.

FIGS. 8 and 9 illustrate a cylinder head for an engine being tested according to the present invention.

DETAILED DESCRIPTION OF THE PREFERRED EMBODIMENTS

Figure 1:
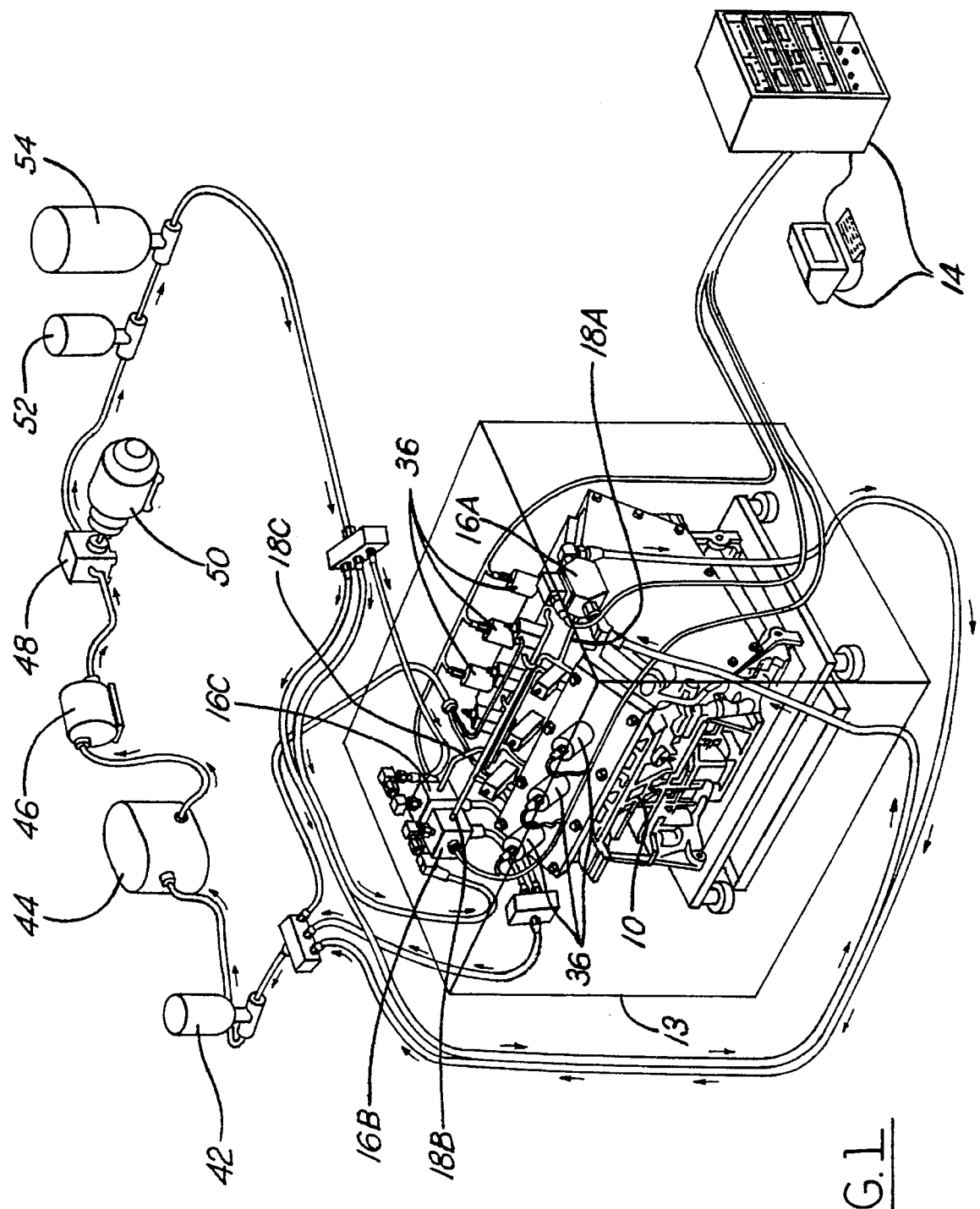
FIG. 1 is a partially schematic representation showing a rapid life test system according to the present invention.

As shown in FIG. 1, engine cylinder block 10 is set up for testing according to the present invention by interconnection with a hydraulic pressure system, which includes electronic controller 14, which in this case operates a number of hydraulic control valves 16. Hydraulic control valve 16A is a servovalve having pressure conduit 18A attached thereto. Servo valves 16A–16C and pressure conduits 18A–18C are shown in greater detail in FIG. 2.

Hydraulic control valve 16A and pressure conduit 18A conduct high pressure hydraulic fluid into cylinders 1 and 5 of engine block 10. Although engine block 10 is a six cylinder V-type block, those skilled in the art will appreciate in view of this disclosure that a system according to the present invention may be employed with not only V-6 cylinder blocks but also V-type blocks having any number of cylinders, and, for that matter, in-line and opposed configuration cylinder blocks. Hydraulic control valve 16B and its companion pressure conduit 18B conduct high pressure hydraulic fluid to cylinders 3 and 4 of engine block 10. Finally, control valve 16C and pressure 18C conduct hydraulic fluid under pressure to cylinders 2 and 6. Notice that the cylinders serviced by each of the pressure conduits are separated, and not adjacent; as a result, the forces produced within engine block 10 by the hydraulic pressure within the operating cylinders do not cancel one another. This is important because it allows the test performance of a system according to the present invention to more accurately simulate the pressures and resultant stresses, particularly cylinder block main bearing bulkhead stresses, produced within the engine block when the engine is firing.

Returning to FIG. 1, and moving through a hydraulic system according to the present invention, fluid returning from cylinder block 10 is processed through a small accumulator 42, then through a fluid reservoir 44 and filter 46. The fluid is elevated to a high pressure by means of hydraulic pump 48 and its driving motor 50. Thereafter, small accumulator 52 and large accumulator 54 receive the fluid. The purpose of these accumulators is to damp out unwanted pressure pulsations in the fluid pressure lines or hoses. After passing through accumulator 54, the fluid moves to each of hydraulic control valves 16. Each of valves 16A–C is operated by electronic controller 14.

Figure 3:
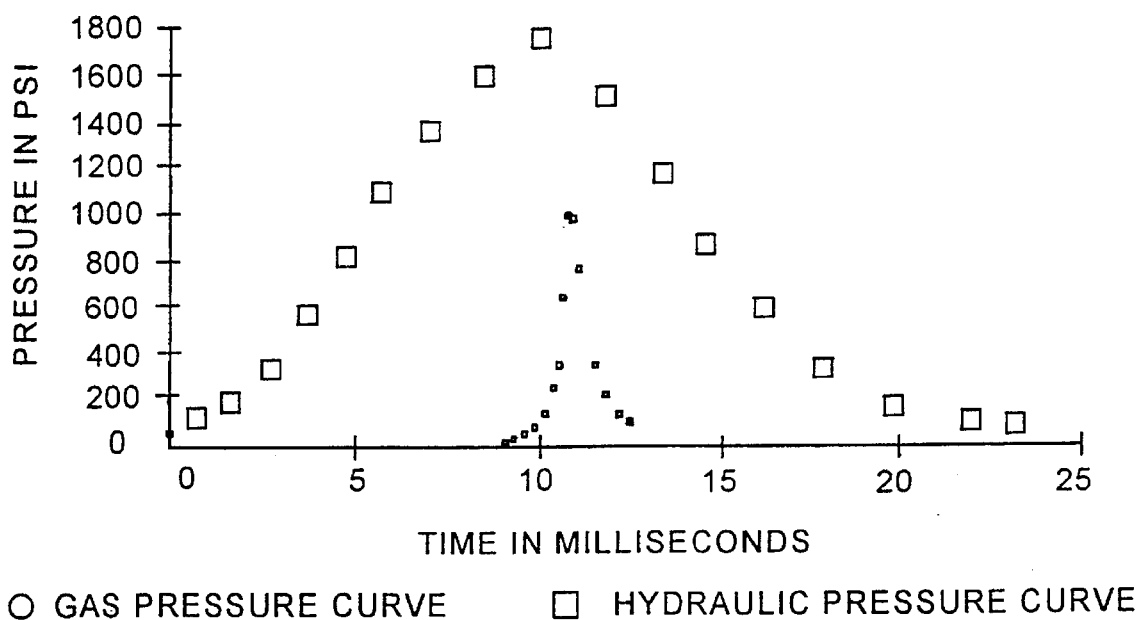
FIG. 3 is a graphical representation illustrating a typical time-pressure history produced by a system according to the present invention.

FIG. 3 illustrates a pressure plot which may be obtained according to the present invention. Notice that the maximum pressure in the firing engine is approximately 1,000 PSI, whereas as with the hydraulic life test system, the selected test pressure was approximately 1,800 PSI. And, testing may be done at much higher pressures, perhaps exceeding 3000 PSI. As a result, a system according to the present invention may be used to accelerate the testing of an engine, including the cylinder block and, if desired, the cylinder head, so as to more quickly produce failures which are representative of very extended, very severe engine testing. Those skilled in the art will appreciate in view of this disclosure, moreover, that testing with the present system should be less expensive than actual firing type of engine tests because of the absence of the need to actually run the engine on an engine dynamometer. Another major advantage of a system according to the present invention resides in the fact that a new cylinder block design may be tested extensively without the need for other prototype hardware such as pistons, connecting rods., and crankshafts. This means that testing may be completed on the basic cylinder block and cylinder head designs without the risk that other prototype components such as pistons and connecting rods may fail, possisbly destroying a cylinder block and greatly prolonging the time required to complete the test. FIG. 1 shows that engine block 10 and the other hardware directly associated with engine block 10 may be mounted within environmental chamber 13, which allows the temperature of block 10 to be elevated and depressed to levels which approximate the temperatures encountered during actual engine operation. For example, a cylinder block may be cycled from 0° F. to 250° F. This is possible because chamber 13 may be provided with equipment (not shown) for both adding and extracting heat from cylinder block 10. Such equipment is well known in the art of engine testing and is beyond the scope of the present invention.

FIGS. 6–9 illustrate various components of a system according to the present invention. FIG. 6 illustrates center shaft 26, which replaces the convention engine crankshaft. Center shaft 26 is constructed to have very good fatigue life, but to have bending characteristics which mimic the characteristics of the engine's actual crankshaft, so as to more accurately simulate the loads produced on the lower end of cylinder block 10 during engine firing. FIG. 7 shows piston 20 and connecting rod 24 situated within cylinder 12 of engine block 10. Cylinder head 28 is also shown with intake port 22 and exhaust port 34. Pressure transducer 40 is located in cylinder head 28. Cylinder head 28 shown in FIG. 7 could be an actual cylinder head modified for use with a test according to the present invention. In this regard, conduit 56 is provided for conducting hydraulic fluid into cylinder 12. And, the opening of exhaust port 34 is closed off via plate 58. FIG. 7 also illustrates special piston 20 which, along with connecting rod 24, is used in lieu of the standard piston and connecting rod. Piston 20 has reinforced head 20A, which retains a sealing ring (not shown), immediately below the head of the piston. The sealing ring, which may be formed, for example, from a suitable elastomer, is intended to withstand extremely high hydraulic pressures with minimum leakage.

Figure 2:
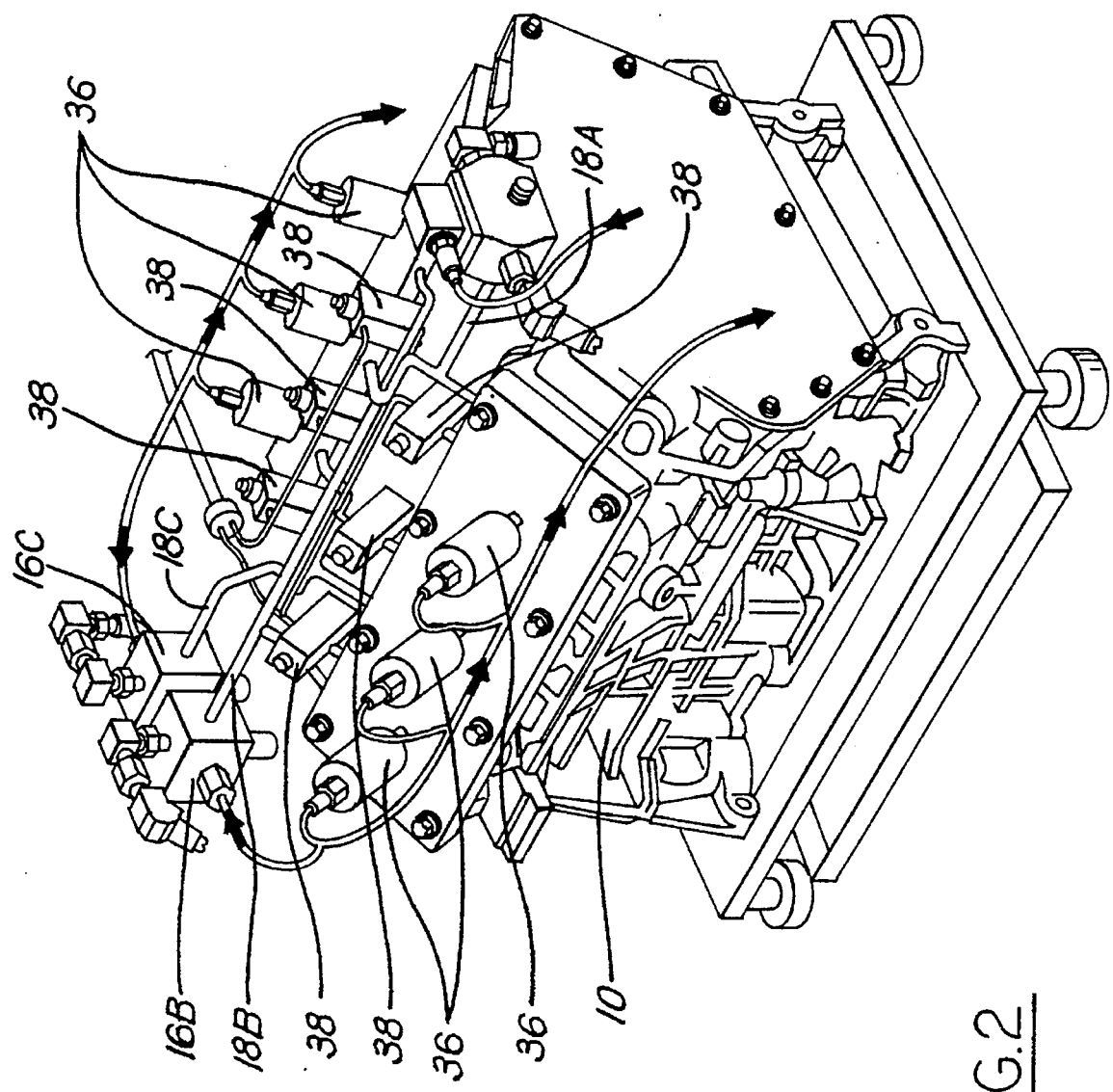
FIG. 2 is a perspective view of an engine block which has been instrumented for testing according to one aspect of the present invention.

During testing, pressure within cylinders 12 is monitored by a plurality of pressure transducers 36 (see FIG. 2). Each of transducers 36 is connected with electronic controller 14, and each transducer produces a pressure signal which is related to the magnitude of the hydraulic pressure within the particular cylinder being measured. Controller 14 uses the value of the measured pressure in the feedback loop to control each of valves 16A–C to assure that the operating cylinders are subjected to substantially equal hydraulic pressures. Controller 14 opens and closes valve 16A–C at a frequency which allows the pressure pulsations produced within the cylinders to simulate the gas pressure loading imposed upon cylinders 12 when the engine is firing. Control of the pressure within the cylinders is aided by a plurality of needle valves 38, which are also shown in FIG. 2. Each of the operating cylinders has an associated needle valve 38, which allows hydraulic fluid to escape from one of cylinders 12, with valve 38 being adjusted to allow the pressure in cylinder 12 to decay at a rate which is appropriate to produce the pressure waveform illustrated in FIG. 3. If desired, needle valves 38 may either be solenoid operated, or replaced by other types of solenoid valves operated in either case by controller 14. Properly sized, solenoid operated valves 38 will allow pressure to be increased at a greater rate, as well as allowing pressure to decay at a greater rate, so as to more closely simulate the pressure rise and decay in a firing engine. Regardless of the type of valve 38, fluid is allowed to circulate through the system, so as to avoid undue elevation of the temperature within cylinders 12.

FIGS. 8 and 9 illustrate a test cylinder head for use with a system according to the present invention. Cylinder head 28 has a plurality of intake ports 30 and a plurality of exhaust ports 32. If this type of cylinder head is used, pressure conduits 18 will be applied or connected with intake ports 30; needle valves 38 will be connected with exhaust ports 32. Finally, pressure transducers 40 will be applied to transducer ports 39.

Figure 4:
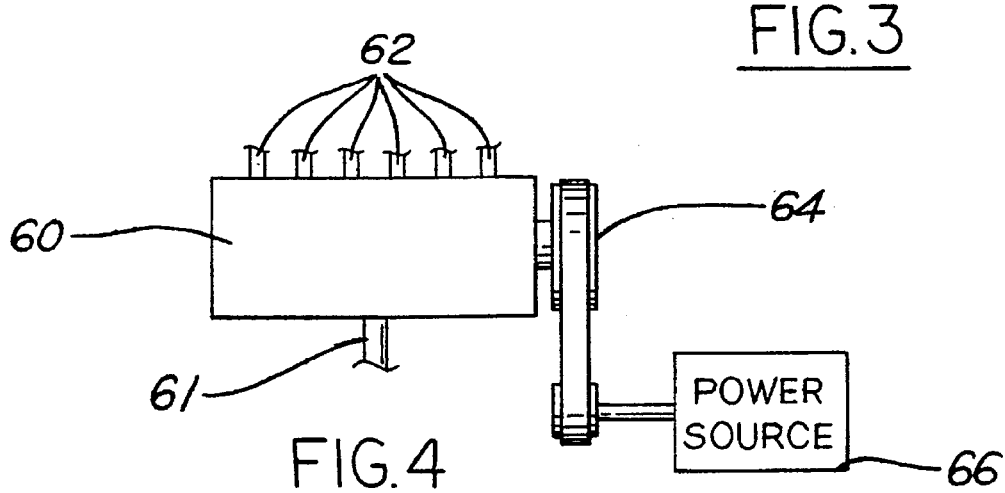
FIG. 4 illustrates an in-line type of high speed valve suitable for use with a system according to the present invention.
Figure 5:
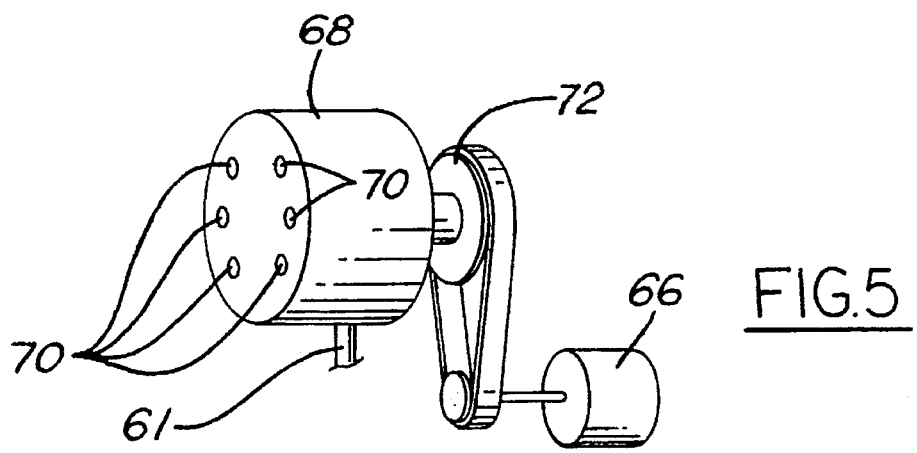
FIG. 5 illustrates a high speed rotary valve suitable for use with a system according to the present invention.

FIGS. 4 and 5 illustrate hydraulic control valves according to another aspect of the present invention. Control valve 60 in FIG. 4 is an in-line valve which is driven by power source 66, which may, for example, comprise a hydraulic or electric motor or some other type of rotary power source. Valve 40 is driven by means of pulley 64. A series of discharge ports 62, equal in number to the operating cylinders of the engine, communicate via a plurality of pressure conduits 18 (not shown) to each of the operating cylinders of engine block 10. Although valve 60 may be merely a valving mechanism for conducting high pressure fluid, entering valve 60 at port 61, to the operating cylinders via discharge port 62, those skilled in the art will appreciate in view of this disclosure that valve 60 could also provide a boosting effect in the nature of a pump. Internal details of valve 60 are beyond the scope of this invention and may be selected from a variety of types of valves which are operable by means of a camshaft contained within a valve and driven by pulley or gear in the manner of a fuel injection pump.

FIG. 5 illustrates a distributor valve driven by pulley 72 and power source 66. Valve 68 has a plurality of discharge ports 70 which are connected via pressure conduits 18 (not shown) to each of the operating cylinders of the engine. As before, valve 68 is furnished with hydraulic fluid at port 61, and may be selected from any of the distributor or rotary valves known to those skilled in the art and suggested by this disclosure. Moreover, valve 68 may also have a pumping or boost function similar to that of a rotary type of fuel injection pump used with diesel engines. Again, the precise details of valve 68 are outside the scope of this invention.

While the invention has been shown and described in its preferred embodiments, it will be clear to those skilled in the arts to which it pertains that many changes and modifications may be made thereto without departing from the scope of the invention. As but one example, in order to further accelerate a life cycle test, electronic controller 14 may operate the hydraulic control valve such that hydraulic pressure loading is applied to the operating cylinders in an overlapping manner, with the result that two or more operating cylinders will simultaneously be subject to hydraulic pressure. It has been determined that such a load pattern will greatly speed the fatigue process induced in the cylinder block by the present system.

We claim:

1. A system for hydrostatically testing a cylinder block for an internal combustion engine by simulating the gas loads imposed upon the cylinder block when the engine is operating, with said system comprising:

an engine cylinder block having a plurality of operating cylinders;

an electronic controller;

a source of hydraulic pressure;

a plurality of hydraulic control valves operatively connected with said source of hydraulic pressure, with said valves also being connected with and controlled by said electronic controller;

and a plurality of pressure conduits extending from said hydraulic control valves to the operating cylinders, such that hydraulic fluid is conducted into at least two of the engine's cylinders from each of the hydraulic control valves at pressures and frequencies which simulate the magnitude and frequency of the gas pressure loading imposed upon the operating cylinders when the engine is firing.

2. A system according to claim 1, wherein said fluid is furnished to said operating cylinders at a variable pressure.

3. A system according to claim 1, wherein said hydraulic fluid is furnished to said operating cylinders at a pressure which is varied with time to simulate the pressure imposed upon the operating cylinders when the engine is firing.

4. A system according to claim 1, wherein the at least two engine cylinders serviced by each of said pressure conduits are separated such that the forces produced within the engine block by the hydraulic pressure within the operating cylinders do not cancel one another, such that different areas of the cylinder block are stressed simultaneously.

5. A system according to claim 1, wherein said controller directs said hydraulic control valves to supply oil under pressure to said operating cylinders such that the pressure imposed upon the engine cylinders follows the firing order of the engine.

6. A system for hydrostatically testing a cylinder block for an internal combustion engine by simulating the gas loads imposed upon the cylinder block when the engine is firing, with said system comprising:

an engine cylinder block having a plurality of operating cylinders; an electronic controller;

a source of hydraulic pressure;

a hydraulic control valve operatively connected with said source of hydraulic pressure, with said valve also being connected with and controlled by said electronic controller; and a plurality of pressure conduits, with at least one conduit extending from said hydraulic control valve to each of the operating cylinders such that hydraulic fluid is conducted into the operating cylinders at a pressure and frequency which simulate the gas pressure loading and frequency imposed upon the operating cylinders when the engine is firing.

7. A system according to claim 6, wherein said hydraulic control valve comprises an in-line valve having a plurality of discharge ports, with at least one discharge port for each of the operating cylinders of the engine.

8. A system according to claim 6, wherein said in-line valve comprises a rotary valve having a plurality of discharge ports, with at least one discharge port for each of the operating cylinders of the engine, with the rotary valve being driven by a rotary power source at a speed which simulates the firing frequency of the engine, and with the discharge ports being connected with the pressure conduits such that the operating cylinders are subjected to hydraulic pressure loading in the same sequence as the firing order of the engine.

9. A system according to claim 6, wherein said hydraulic control valve comprises a distributor valve having a plurality of discharge ports, with at least one discharge port for each of the operating cylinders of the engine, with said distributor valve being driven by a rotary power source.

10. A system according to claim 6, wherein said electronic controller operates said hydraulic control valve such that hydraulic pressure loading is applied to the operating cylinders in an overlapping manner, such that two or more operating cylinders will simultaneously be subject to hydraulic pressure.

11. A system for hydrostatically testing a cylinder block for an internal combustion engine by simulating the gas loads imposed upon the cylinder block when the engine is operating, with said system comprising:

an engine cylinder block having a plurality of operating cylinders;

an electronic controller;

a hydraulic pressure source connected with and controlled by said electronic controller; and a plurality of pressure conduits, with at least one conduit extending from said hydraulic pressure source to each of the operating cylinders, with said electronic controller operating the hydraulic pressure source such that hydraulic fluid is conducted into the operating cylinders at pressures and frequencies which simulate the gas pressure loading imposed upon the operating cylinders when the engine is firing.

12. A system according to claim 11, wherein said controller operates the hydraulic pressure source such that the operating cylinders are subjected to pressure according to the firing order sequence of the engine.

13. A system according to claim 12, wherein said controller operates the hydraulic pressure source such that the operating cylinders are subjected to pressure which is in excess of the gas pressure imposed upon the operating cylinders when the engine is firing.

14. A system according to claim 12, further comprising a plurality of pressure transducers for monitoring the hydraulic pressure produced within said operating cylinders, with each of said transducers operatively connected with the controller, and with each transducer producing a pressure signal which is related to the magnitude of the hydraulic pressure within the particular cylinder being measured, with said controller operating the hydraulic pressure source according to the value of each pressure signal, such that that the operating cylinders are subjected to substantially equal hydraulic pressures.

15. A system according to claim 12, further comprising a plurality of pistons and connecting rods mounted within the operating cylinders in the location of the engine's standard pistons and connecting rods, with said connecting rods being connected to a center shaft having bending characteristics which duplicate the bending characteristics of the engine's standard crankshaft.

16. A system according to claim 11, further comprising a cylinder head affixed to said cylinder block, with said cylinder head having an intake port for each operating cylinder, and with each of said intake ports being operatively connected with at least one of said pressure conduits.

17. A system according to claim 11, further comprising a plurality of solenoid valves for allowing hydraulic fluid to escape from the working cylinders, with said solenoid valves being controlled by said electronic controller.

18. A system according to claim 11, further comprising an environmental chamber situated about said cylinder block, with said environmental chamber being provided with a system for both supplying and extracting heat from said cylinder block such that said cylinder block may be tested at a plurality of temperatures.

\* \* \* \* \*